United States Patent [19]

Stack

[11] Patent Number: 4,538,638
[45] Date of Patent: Sep. 3, 1985

[54] PLASTIC LINED DIAPHRAGM VALVE

[75] Inventor: Eugene V. Stack, Bay City, Mich.

[73] Assignee: The Dow Chemical Company, Midland, Mich.

[21] Appl. No.: 587,714

[22] Filed: Mar. 8, 1984

[51] Int. Cl.³ .............................................. F16K 1/00
[52] U.S. Cl. .................................... 137/375; 251/331; 251/366
[58] Field of Search ..................... 251/331, 61.1, 366; 137/375

[56] References Cited

U.S. PATENT DOCUMENTS

| | | | |
|---|---|---|---|
| 2,767,956 | 10/1956 | Rubin | 251/331 |
| 3,206,530 | 9/1965 | Boteler | 137/375 |
| 3,407,838 | 10/1968 | Boteler | 137/375 |
| 3,703,910 | 11/1972 | Smith | 137/375 |
| 4,029,296 | 6/1977 | Hartmann et al. | 251/331 |
| 4,304,260 | 12/1981 | Turner et al. | 251/331 |
| 4,319,737 | 3/1982 | Waterfield | 137/375 |

Primary Examiner—A. Michael Chambers
Attorney, Agent, or Firm—R. B. Ingraham

[57] ABSTRACT

Synthetic resinous thermoplastic lines in a diaphragm valve are stabilized against movement by extending the lines into recesses in the bonnet receiving face of the valve body.

4 Claims, 5 Drawing Figures

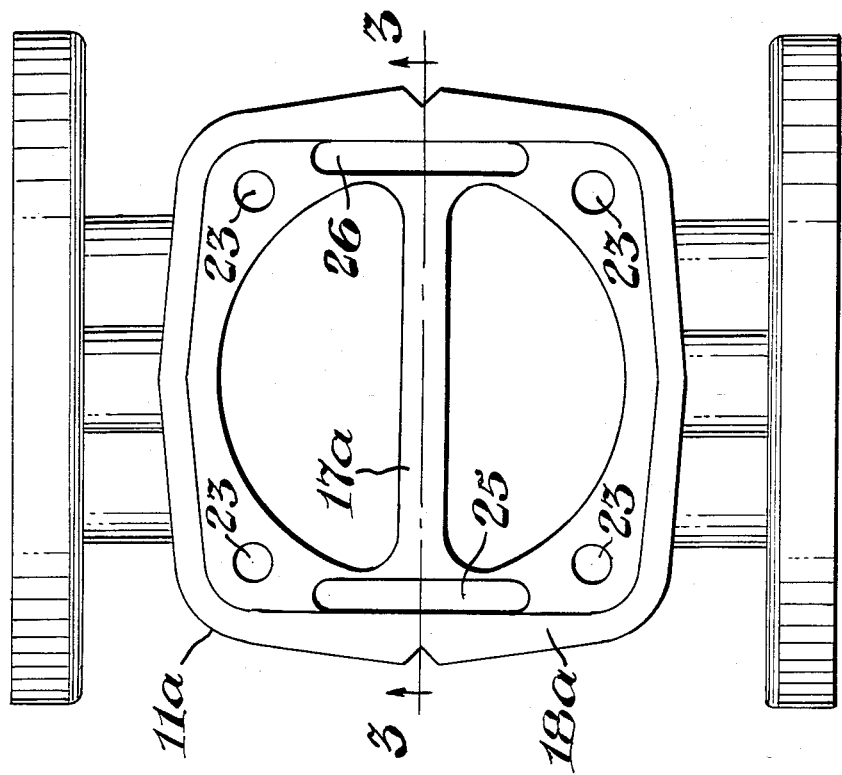
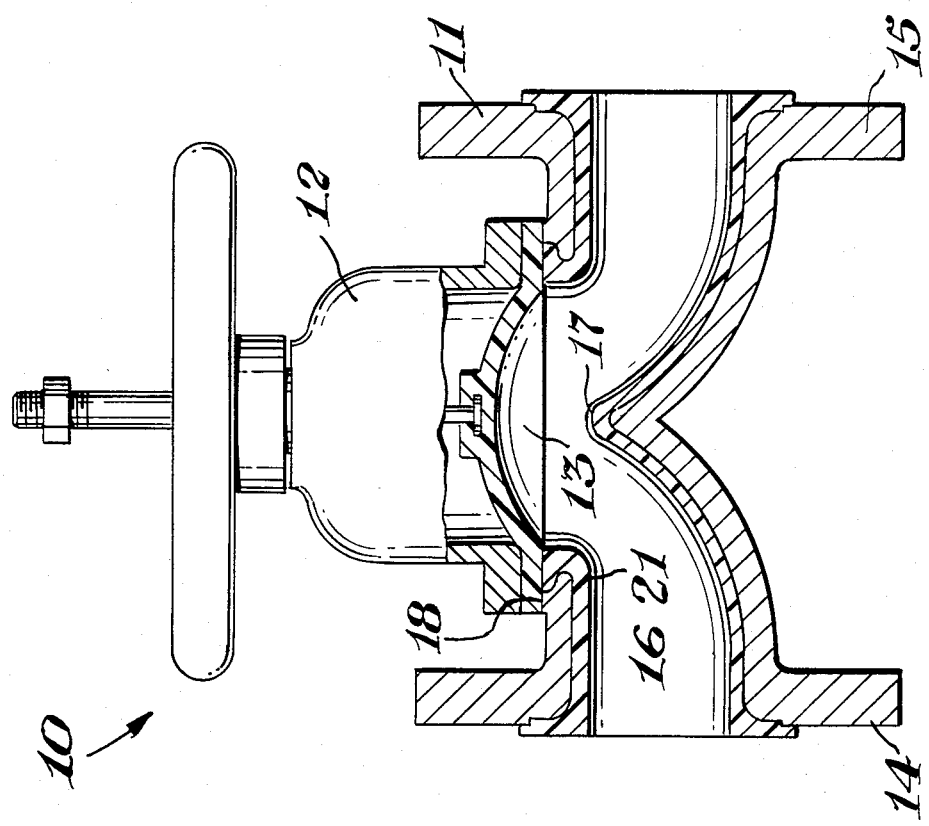

PLASTIC LINED DIAPHRAGM VALVE

Plastic lined diaphragm valves have found wide use in industry. Such valves comprise two major portions: (1) a bonnet assembly which carries the diaphragm and (2) a body portion having a weir disposed therein. Such valves are generally constructed in such a manner that it is only necessary to provide a plastic lining in the body portion. Such linings are applied by a molding process wherein the heat plastified material is forced into a space within the body, defined by the body and a removable mandrel assembly. When such plastic lined valves are employed in high temperature service, occasionally shrinking of the lining occurs, particularly in the region of the weir, in such a manner that contact of the liner with the diaphragm is reduced. By the term "high temperature" is meant a temperature at which deformation of the liner can occur without applying external force.

It would be desirable if there were available an improved plastic lined diaphragm valve.

It would also be desirable if where were available an improved diaphragm valve having a reduced tendency for deformation of a plastic liner therein at higher temperatures.

It would also be desirable if such an improved valve were readily and easily constructed.

These benefits and other advantages in accordance with the present invention are achieved in an improved plastic lined diaphragm valve, the diaphragm valve comprising a body portion, the body portion having a first end and a second end, the passageway extending from said first end to said second end, the body portion defining a weir, the weir extending in a direction generally perpendicular to a longitudinal axis of the passageway, the body defining an intermediate opening at a location generally opposite the weir; about the opening opposite the weir a bonnet receiving surface, the bonnet receiving surface being of annular configuration, a plastic lining disposed within the body, the lining extending out of said body and covering at least a portion of the bonnet receiving surface, a bonnet assembly affixed to the bonnet receiving surface; the improvement which comprises the bonnet receiving surface of the body defining at least a first and second recess, said first and second recesses being generally diametrically opposed, and generally adjacent the weir with the further limitation that the plastic lining extends into said recesses.

Further features and advantages of the present invention will become more apparent from the following specification taken in connection with the drawing wherein:

FIG. 1 is a longitudinal sectional view of a plastic lined valve in accordance with the present invention;

FIG. 2 is a view of a valve body in accordance with the present invention prior to lining;

Figure 3:
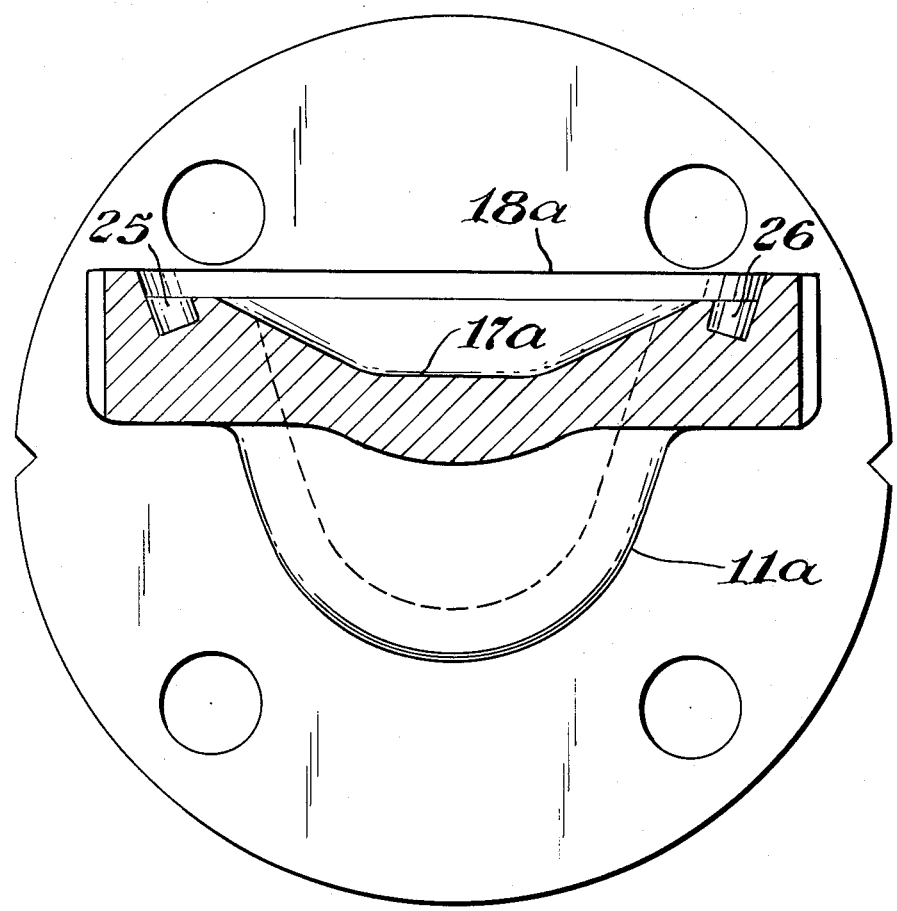
FIG. 3 is a sectional view of the body of FIG. 2 taken along the line 3—3 thereof.

In FIG. 1 there is schematically depicted a diaphragm valve in accordance with the present invention generally designated by the reference numeral 10. The valve 10 comprises a valve body 11 having affixed thereto a bonnet assembly 12 having a movable diaphragm 13. The body 11 has a first end 14 and a second end 15. The body 11 defines a passageway 16 extending from the first end 14 to the second end 15. Disposed within the passageway 16 is a weir 17. The passageway 16 is in full communication with a bonnet receiving surface 18. The surface 18 is of generally annular configuration. The valve body 11 has disposed therein a plastic or synthetic resinous thermoplastic lining 21. The lining 21 extends to partially cover the bonnet receiving surface 18 and extends radially outwardly at first end 14 and second end 15.

In FIG. 2 there is depicted a top view of a valve body 11a prior to lining. The valve body 11a has a bonnet receiving surface generally designated by the reference numeral 18a. The bonnet receiving surface has a generally annular configuration and has disposed therein threaded apertures 23 which receive bolts to affix the bonnet assembly thereto. The body 11a has a weir 17a extending generally transverse. The body receiving surface 18a defines a first generally elongate recess 25 and a second elongate recess 26. The elongate recesses extend generally perpendicular to the weir and generally parallel to a passageway through the valve body 11a.

In FIG. 3 there is depicted a cross section view of the valve body 11a taken along the line 3—3 of FIG. 2, depicting the configuration of the recesses 25 and 26 relative to the weir 17a. The recesses 25 and 26 have been formed by milling utilizing an end mill in such a manner that a projection of the recesses in a direction away from the weir and the surface 18 would be divergent.

Figure 4:
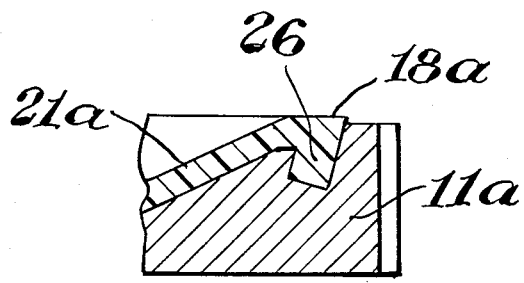
FIG. 4 is a fractional sectional view of a portion of a lined valve body in accordance with the present invention.

In FIG. 4 there is depicted a fractional view of a body such as the body 11a depicting the manner in which a plastic liner 21a is molded into a recess such as the recess 26.

Figure 5:
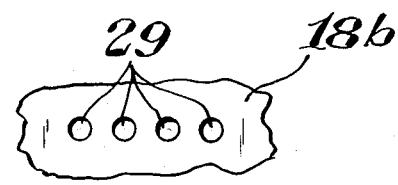
FIG. 5 is an alternate arrangement wherein a plurality of recesses are employed.

In FIG. 5 there is depicted a fractional view of a bonnet receiving surface 18b having formed therein a plurality of recesses 29.

Valves in accordance with the present invention are readily prepared by conventional plastic lined techniques. The recesses in the bonnet receiving face can be formed by a variety of means. For example, the configuration of FIG. 5 is readily prepared by drilling a plurality of shallow, generally cylindrical holes in the bonnet receiving face, generally adjacent the weir. The improvement as depicted in FIGS. 2, 3 and 4 is readily obtained by milling recesses 25 and 26 utilizing an end mill. Such recesses can be formed in the bonnet receiving face utilizing a milling cutter which is disposed vertically or at an angle to the bonnet receiving face. Plastic lined valves in accordance with the present invention can utilize a variety of plastics, such as polypropylene, vinylidene chloride polymers, fluorocarbon polymers and the like.

Comparative tests indicate that valves in accordance with the present invention at elevated temperatures exhibit substantially increased dimensional stability of the liner in the region of the weir when operated at higher temperatures.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An improved plastic lined diaphragm valve, the diaphragm valve comprising a body portion, the body portion having a first end and a second end, the passageway extending from said first end to said second end, the body portion defining a weir, the weir extending in a direction generally perpendicular to a longitudinal axis of the passageway, the body defining an intermediate opening at a location generally opposite the weir; about the opening opposite the weir a bonnet receiving surface, the bonnet receiving surface being of annular configuration, a plastic lining disposed within the body, the lining extending out of said body and covering at least a portion of the bonnet receiving surface, a bonnet assembly affixed to the bonnet receiving surface; the improvement which comprises the bonnet receiving surface of the body defining at least a first and second recess, said first and second recesses being generally diametrically opposed, and generally adjacent the weir with the further limitation that the plastic lining extends into said recesses.

2. The valve of claim 1 wherein plastic lining fills the recesses.

3. The valve of claim 1 wherein the recesses are elongate.

4. The valve of claim 1 wherein a plurality of recesses are defined by the valve body.

* * * * *